UNITED STATES PATENT OFFICE.

HENRY DREYFUS, OF BASEL, SWITZERLAND.

MANUFACTURE OF ACETIC ACID.

1,286,255.   Specification of Letters Patent.   Patented Dec. 3, 1918.

No Drawing.   Application filed June 1, 1917.   Serial No. 172,326.

*To all whom it may concern:*

Be it known that I, HENRY DREYFUS, of Basel, Switzerland, have invented certain new and useful Improvements in the Manufacture of Acetic Acid, of which the following is a specification.

The problem of the oxidation of acetic aldehyde for the production of acetic acid therefrom, although apparently fairly easy, is nevertheless very complicated, especially when it is required to find an oxidation process which is cheap, gives a good yield and is capable of industrial application.

The present invention provides a simple, cheap, and efficient process for this purpose, which can be carried out in simple apparatus.

Various proposals have been made to oxidize acetaldehyde to acetic acid by passing the acetaldehyde together with air or oxygen over contact substances. In such processes the reaction has been conducted at temperatures below the boiling point of acetic acid, and in such conditions the acetic acid formed is condensed in the apparatus.

According to the present invention the oxidation of acetaldehyde to acetic acid is effected by passing the acetaldehyde with air or oxygen through vessels or tubes lined, filled or provided with platinum or other substances known to act as catalysts in this reaction, at a temperature above the boiling point of acetic acid and below 400° C., and preferably between 130° and 400° C., the acetic acid formed thereby remaining as vapor and not condensing in the reaction vessels. I have found that by this means a larger yield of acetic acid can be obtained.

When platinum is used it is preferably employed precipitated with the greatest possible surface, for example in the form of platinized asbestos containing from 2% to 5% of platinum (by weight).

For working continuously it is preferable that the acetic aldehyde shall be entrained through the apparatus by the oxygen or air by passing this through the acetaldehyde so as to vaporize the same and carry the vapors forward through the reaction apparatus. The acetic acid formed by the reaction at the temperature above its boiling point remains as vapor in the contact vessels or tubes and does not give rise to a condensation of liquid which might disturb or displace the contact mass, say platinized asbestos, which should be well distributed in the vessels or tubes containing the contact substance. On issuing from the contact vessels or tubes the vapors of acetic acid may be condensed by a suitable cooler and in this way a high yield of acetic acid can be obtained.

In carrying out the invention the air or oxygen for entraining the acetaldehyde may be at a higher or lower temperature, according as it is desired to pass more or less acetic aldehyde, relatively to the air or oxygen. By properly regulating the current of the vapors passing through the contact vessels or tubes the acetic aldehyde may be transformed with a high yield into acetic acid.

The temperature of the mixture of air or oxygen and acetaldehyde vapor is preferably regulated by heating the same by causing it before entering the contact vessels or tubes, to pass through vessels, tubes or chambers capable of being heated to a regulatable temperature for example by gas or the like, the temperature being controlled in the said vessels, tubes, or chambers, by means of thermometers; in this way the most favorable temperature can always be maintained during the progress of the manufacture in the contact vessels or tubes. Once the reaction is in progress the temperature may also be maintained by the heat evolved by the reaction. By causing the fairly hot vapors after the oxidation and containing the acetic acid, to pass through special pipes passing through the interior of the vessels, tubes, or chambers in which the mixture of air or oxygen and acetic aldehyde is heated, much heat is saved, as a portion of this heat is then imparted to the vapors before they enter the contact vessels or tubes. For the purpose of the invention I may employ contact apparatus similar in principle to those used for the oxidation of sulfurous acid to sulfuric anhydrid ($SO_3$) in contact vessels or tubes containing platinized asbestos or other contact substances, the acetic aldehyde mixed with air or oxygen being passed through the large vessels or tubes provided externally with a gas fired or other heating arrangement for obtaining by an accurate regulation the exact temperature desired, so that the vapors thence enter the contact vessels or tubes at the most suitable temperature. In these latter the temperature is also controlled with the aid of suitable thermometers in order to avoid any overheating by reason of the reaction. If required these contact vessels or tubes may have an arrangement for admitting air at different points in desired quantities for also regulating the temperature in the same manner as in the contact vessels or tubes for the manufacture of sulfuric anhydrid. Moreover the heat of the vapors containing the acetic acid which issue from the contact vessels or tubes may now serve for the heating of the mixture of acetic aldehyde and air, before it enters the contact vessels.

What I claim as my invention, and desire to secure by Letters Patent, is:—

1. A process of making acetic acid, which comprises passing a mixture containing acetaldehyde and free oxygen in contact with a catalyst, at a temperature between the boiling point of acetic acid and 400° C.

2. A process of making acetic acid, which comprises passing a mixture containing acetaldehyde and air in contact with a catalyst at a temperature between the boiling point of acetic acid and 400° C.

3. A process of making acetic acid, which comprises passing a mixture containing acetaldehyde and free oxygen in contact with a catalyst, at a temperature between 130° and 400° C.

4. A process of making acetic acid, which comprises passing a mixture containing acetaldehyde and air in contact with a catalyst at a temperature between 130° and 400° C.

5. A process of making acetic acid, which comprises passing a mixture containing acetaldehyde vapor and free oxygen in contact with a catalyst, at a temperature between the boiling point of acetic acid and 400° C., and preheating the mixture about to come in contact with the catalyst, by the heat of the vapors resulting from the acetic-acid-producing reaction.

6. A process of making acetic acid, which comprises passing a mixture containing acetaldehyde vapor and air in contact with a catalyst, at a temperature between the boiling point of acetic acid and 400° C., and preheating the mixture about to come in contact with the catalyst, by the heat of the vapors resulting from the acetic-acid-producing reaction.

In witness whereof I have hereunto signed my name in the presence of two subscribing witnesses.

HENRY DREYFUS.

Witnesses:
Thomas Laing Whitehead,
Robert Milton Spearpoint.